United States Patent [19]

Müller

[11] 4,331,072
[45] May 25, 1982

[54] DEGERMING OF MAIZE

[75] Inventor: Roman Müller, Niederuzwil, Switzerland

[73] Assignee: Gebrueder Buehler AG, Uzwil, Switzerland

[21] Appl. No.: 188,822

[22] Filed: Sep. 19, 1980

Related U.S. Application Data

[60] Continuation of Ser. No. 12,159, Feb. 14, 1979, abandoned, which is a division of Ser. No. 944,321, Sep. 21, 1978, Pat. No. 4,229,486.

[30] Foreign Application Priority Data

Sep. 30, 1977 [CH] Switzerland ................. 11958/77

[51] Int. Cl.³ ............................................. B02B 3/08
[52] U.S. Cl. ....................................... 99/606; 99/608; 99/610; 99/611; 99/618; 366/326
[58] Field of Search .............. 99/519, 610, 520, 611, 99/605–608, 630, 618; 366/278, 285, 293, 325, 326, 603; 241/7, 199; 426/482, 483, 506, 511, 519

[56] References Cited

U.S. PATENT DOCUMENTS

| | | | |
|---|---|---|---|
| 207,261 | 8/1878 | Engelke et al. | 99/605 |
| 493,603 | 3/1893 | Sibley | 99/607 |
| 4,055,673 | 10/1977 | Mueller et al. | 99/519 |
| 4,148,251 | 4/1979 | Satake | 99/519 |

Primary Examiner—Philip R. Coe
Assistant Examiner—Timothy F. Simone
Attorney, Agent, or Firm—Merchant, Gould, Smith, Edell, Welter & Schmidt

[57] ABSTRACT

Apparatus and method for degerming maize are disclosed. The maize is introduced into a cylindrical, perforated working housing in which is mounted a rapidly rotating rotor which drives the maize along an annular working chamber between the rotor and housing. The rotor carries a large number of blades having edges which detach the germ from the endosperm. A collecting chamber surrounds the working housing, and the working housing is provided with an outlet aperture for oversize particles.

21 Claims, 8 Drawing Figures

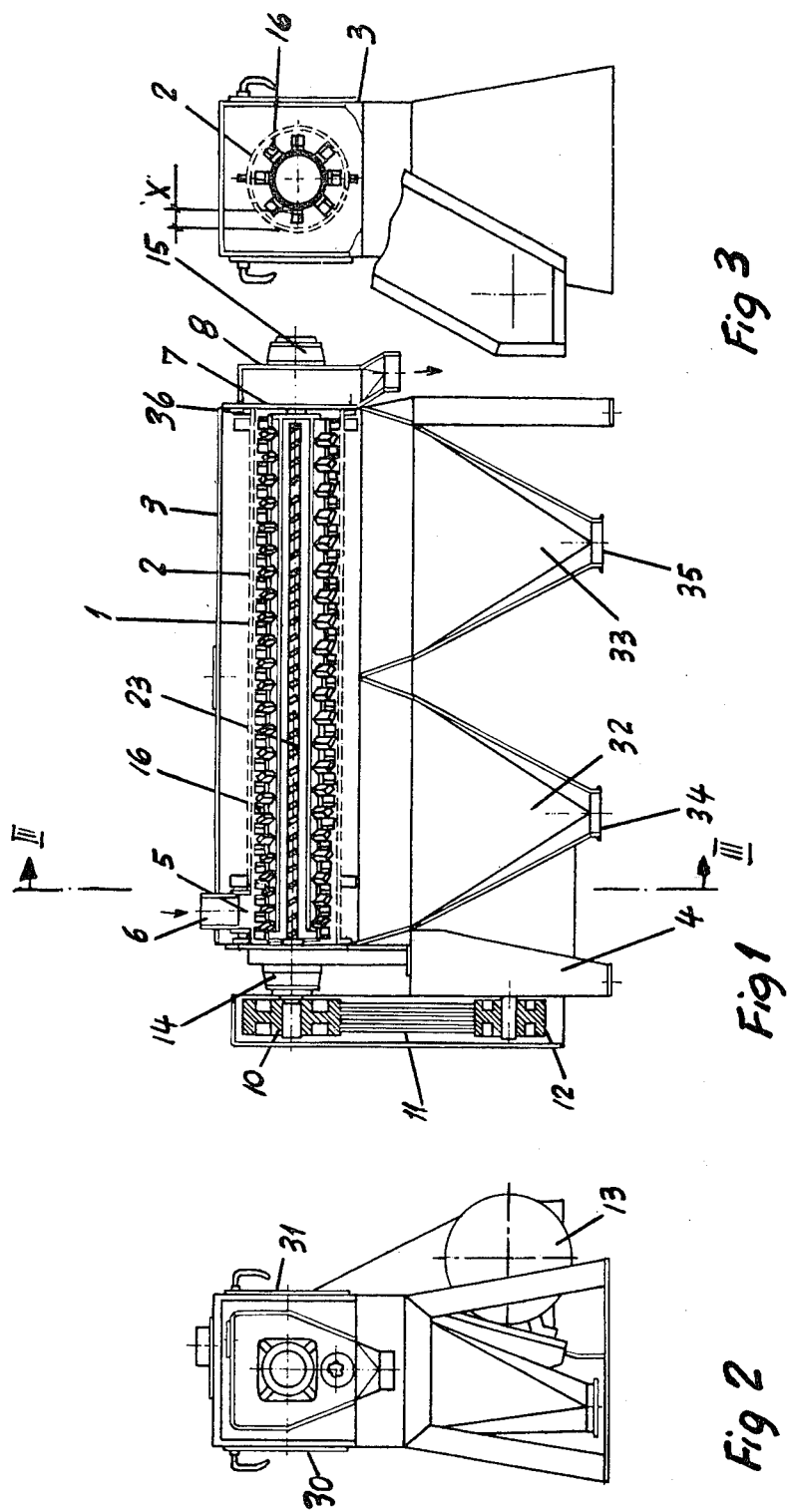

DEGERMING OF MAIZE

This is a continuation of application Ser. No. 12,159, filed Feb. 14, 1979, abandoned, which is a divisional application of Ser. No. 944,321, filed on Sept. 21, 1978, now U.S. Pat. No. 4,229,486.

FIELD OF THE INVENTION

The invention relates to the degerming of maize.

BACKGROUND OF THE INVENTION

The industrial use of cereal maize is becoming more and more important in the foodstuffs and animal feed industries, and also in breweries and for starch production.

Whereas distilleries can use maize without any special preliminary treatment, maize has to be subjected to a deliberate technological processing before being used in breweries and the foodstuffs industries. Here, it is necessary and also usual to carry out dry grinding to obtain grits and semolinas. In all cases, it is desirable to separate out the germs in order to deliver them to an oil extraction stage or for animal feed.

SUMMARY OF THE INVENTION

One of the main objects of a maize mill is on the one hand to obtain the greatest possible yield of pure maize semolina, maize grits or maize flour and the most complete separation possible of maize germ, and on the other hand to minimize the proportion of undesirable fine fragments of grain.

The object of the present invention is to provide improvements in the method and apparatus for degerming maize.

According to one of its aspects the invention provides a method of degerming maize which includes subjecting it in an annular working chamber to the action of a large number of blades carried by a rapidly rotating rotor which drives it along the chamber in swirling fashion and the edges of which detach the germ from the endosperm. We prefer to subject the maize to the action of the blades in a working chamber that is cylindrical. It is preferred to rotate the rotor at a speed in excess of 400 revolutions per minute, desirably between about 800 and 1100 revolutions per minute. Although here, as elsewhere in this specification and claims, where we use the term "about" we prefer figures substantially the same as the actual figures stated but contemplate also figures which deviate from those stated by (plus or minus) 10% or even 20%. We prefer to subject the maize to the action of not less than about 60 blades, desirably between about 120 and 320 blades. Thus, e.g. the speed of the edges of the blades near the periphery of the blades is between about 6 and 40 meters per second, preferably between about 10 and 20 meters per second.

At the present time the widest use of the method is seen to take the form wherein the maize in the form of entire cleaned grains is subjected to a preliminary treatment by water and steam, and during its passage along the annular chamber is formed into a loosely moving layer and degermed and husked.

It is also advantageous to adopt the form wherein germs and broken maize and husk particles are removed as screenings at the outer surface of the annular chamber, and the screenings and the oversize are separated into fractions respectively comprising germs, husk and endosperm.

A further very advantageous use is to drive broken and incompletely degermed maize particles in turbulent manner through the cylindrical annular working chamber and to detach the germs from the endosperm by the rapidly rotating blade edges.

According to another aspect, the invention provides an apparatus for degerming maize including a circular working housing having an inlet aperture, an outlet aperture, a rotor mounted for rapid rotation in the housing, the rotor and housing forming an annular working chamber therebetween, a large number of blades carried by the rotor, the blades having edges which extend along the blades from the vicinity of the wall of the housing in the direction of the rotor. Preferably, the rotor is a hollow shaft. Advantageously the said edges of the blades extend radially with respect to the rotor. After very long experimentation it was possible to establish that the desired results could be achieved in the most satisfactory way if the blades have a flattened profile at their outer end and at least part of the larger face of the blade is inclined at an angle of 60° to 90° to the rotor axis. Depending on particular uses, it may be desirable to provide the housing with a valve in the region of the outlet. The point is that the valve allows the outlet cross-section to be adjusted, prducing a stronger or weaker damming-up effect on the maize. From experiments hitherto it has been found that more particularly if the maize is to be husked and degermed at the same time, best results are obtained by providing a specific damming-up effect in the otherwise loosely moving bed of product. The grains bear against one another and the lateral edges of the blades passing the grains cut and in a sense strip off the husk pieces.

In this way the amount of driving power required is kept low, for a specific throughput, and husking can be carried out at the same time. One of the greatest problems in the preparation of maize is that there are extreme differences in shape and in the treatability of individual maize grains. At least for extreme cases, therefore, it has been found advantageous if the blades are adjustable to different angular positions. An important point is also seen to be that the rotor is constructed as a feed screw conveyor in the region of the inlet. Initially the persons skilled in the art who took part in development trials had considerable doubts about the suitability of this idea. People were convinced that with speeds of about 800–1100 revolutions per minute and a housing and rotor diameter of about 300 mm an undesirable amount of grain fragments would be produced and a large proportion of the grains would be thrown about in an uncontrolled manner. Hence they were all the more surprised that not only was friction free introduction of the product possible but in addition there was a complete absence of sticking and accumulation of fine particles in the inlet region such as has hitherto been known and expected particularly with moist maize. It may well be that individual maize particles were broken with the very high feed screw speed used. This does not have an adverse effect considering the husking operation as a whole. The optimum speeds for the outermost tips of the blades of the rotor was found to be a range of 10–20 m/sec. The best entry conditions could be obtained for moist raw material by arranging the inlet aperture directly above the worm conveyor and approximately radially relatively to the rotor. But with dry maize it is advantageous to arrange for tangential entry. It has also been found useful to arrange the working housing with the rotor within a collecting casing and to support the working housing relatively to the collecting casing by means of oscillation damping elements. Although the entire apparatus could be positioned vertically, the horizontal arrangement is preferred.

BRIEF DESCRIPTION OF THE DRAWINGS

Several forms of apparatus embodying the present invention will now be described by way of example with reference to the accompanying drawings wherein:

FIG. 1 shows a first form of apparatus in vertical section;

FIG. 2 is a side view of the apparatus of FIG. 1;

FIG. 3 is a section taken on the plane III—III of FIG. 1;

DESCRIPTION OF THE PREFERRED EMBODIMENT

Figure 6:
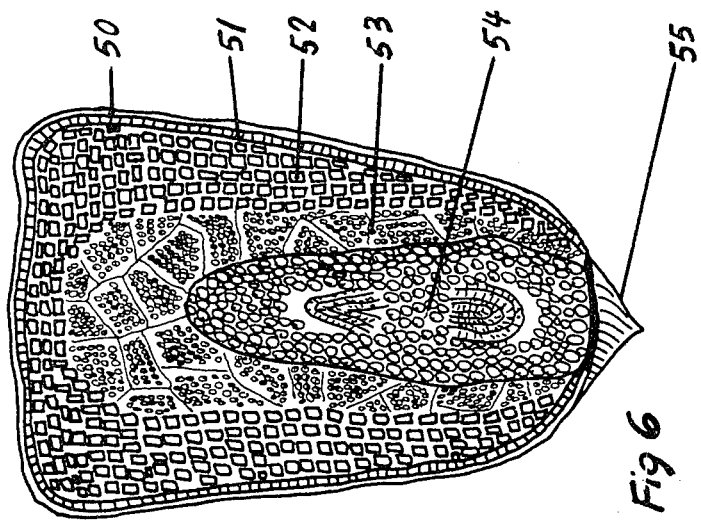
FIG. 6 is a simplified section of a complete maize grain.

The apparatus shown in FIGS. 1, 2 and 3 is arranged horizontally, a rotor 1 being surrounded by a working housing 2 and enclosed by a collecting casing 3 and supported as a unit on a stand 4.

The working housing 2 is formed of two halves which can be dismantled and are made of perforated sheet metal. The working housing 2 also comprises an inlet aperture 5 into which an inlet union 6 opens. The inlet union 6 opens into the working housing 2 vertically and tangentially. This has the advantage particularly in the case of dry maize that the material can be fed in carefully and yet with a high rate of throughput.

At the right-hand side of FIG. 1 a product outlet aperture 7 is provided which is arranged right at the top on the working housing 2 and opens into a collecting receptacle 8.

The perforations in the working housing 2 are sufficiently large to allow the germs, directly after they have been detached by the rotor 1, to pass through the working housing 2. Since the main part of the working housing 2 is also perforated, all the other grain particles which are equal to or smaller than the germs are also passed through the perforations from the working chamber into the collecting casing 3. These measures assist in ensuring that there is only a minimum fraction of broken grain particles with the apparatus at any time.

The rotor 1 is driven by way of a belt pulley 10, V-belt 11 and belt pulley 12 by a motor 13, and supported on two end bearings 14 and 15. The rotational speed of the rotor 1 is usually between about 800 and 1100 revolutions per minute. In special cases it is also possible to set higher or lower rotational speeds for the rotor quite easily by replacing the belt pulleys 10, 12.

Figure 5:
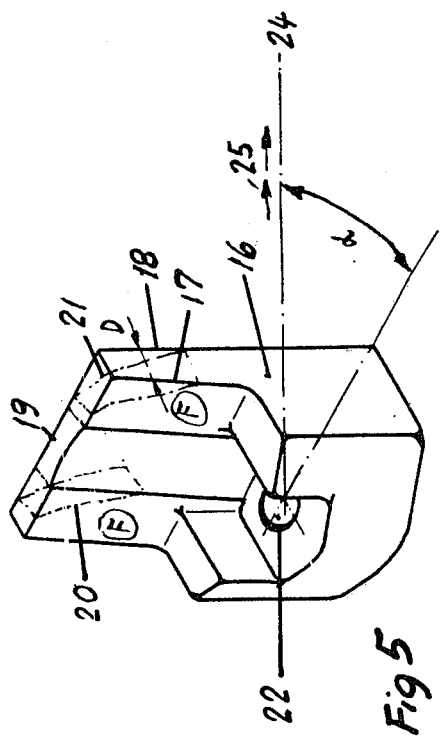
FIG. 5 shows in perspective a blade of the apparatus of FIGS. 1 and 4 on a larger scale.

The rotor 1 has throughout the working chamber or working housing 2 a large number of blades 16 which, as shown, are preferably secured on elongate members in the form of longitudinal strips 23. A blade 16 is shown on a larger scale in FIG. 5. The blade 16 is of such a thickness that it can stand up to the comminuting work which is in fact necessary for degerming. The illustrated blade 16 has two edges 17, 18 which are active in the operation of the blades.

The degerming of maize is counted as one of the most difficult comminuting processes by persons skilled in the art in view of the standards expected at the present day. The germ is to be detached and separated from the remainder of the grain in one piece, cleanly and with the least possible damage. Beater mills, or the corresponding comminuting and grinding techniques, are not suitable for the degerming of maize. It also does not seem possible to obtain an important improvement in the specific degerming of maize with theoretical methods.

After long and intensive development work, it was possible in fact by empirical methods to come to various new conclusions. Probably the most important knowledge obtained appears to be that degerming is achieved to an optimum extent if on the one hand the working space is precisely defined, and preferably has a cylindrical annular shape, and on the other hand the product is driven through the working chamber with a whirling or turbulent action, and the actual degerming work is carried out by a large number of edges 17, 18. For it has been found that the number of blades 16 only indirectly influences the degerming work, but the number of edges 17, 18 have a direct influence. It was possible to prove this by sawing out the central portion 19 of all the blades in an experimental apparatus. Since a relatively soft steel was chosen for this experiment, the effectiveness of the edges could be demonstrated not only by the result of the work but also by the considerable abrasion of the edges (as shown with the chain-dotted lines 20 and 21). A further point is considered to be that surface portions F which have a product conveying action are present, and more particularly the thickness of the blades 16 is sufficiently great, for example up to 1 cm or more. This is not only a question of strength, but it gives a doubling of the effective edges 17, 18. The blade 16 shown in FIG. 5 also has a hole 22 to allow the blade 16 to be screwed to the rotor 1, or the strips 23. This solution allows the blades 16 to have their inclination adjusted about an angle $\alpha$ relatively to the longitudinal axis 24 of the rotor 1, or the direction of conveying 25.

A further observation was also made, the wear along the lines 20 and 21 showing that the working chamber is not pressed full of maize but at least the working zone is in the external region. But this is a pre-requisite if it is desired to ensure a loose turbulent movement of the material in the cylindrical working chamber. Individual grains can escape in an inward direction.

In FIG. 1 and FIG. 2, eight longitudinal strips 23 are shown on the periphery of the rotor. A large number of blades 16 are arranged on each longitudinal strip 23. Over a length of approximately 2 m, the best results were obtained with about 20-40 blades 16 per longitudinal strip 23. From one longitudinal strip 23 to the next the blades 16 are also staggered in the direction to the rotor axis 24. The large number of blades 16 not only intensively processes the mass of product but also guides it in a satisfactory manner. On the other hand the perforation of the working housing 2 exerts a braking effect so that in fact what is obtained is a rake-like guiding effect and correspondingly local turbulent movement. Also the mass of product as a whole is whirled in turbulent manner from the inlet to the outlet aperture 7 in the cylindrical annular chamber about the axis 24 of the rotor 1.

It is also possible for the edges 17, 18 to be arranged from the beginning in a radial direction as illustrated, obliquely as shown by the broken line 20, 21 or even inclined in the axial direction.

A new and very important point is also considered to be the fact that a great amount of the degerming work is carried out in one pass through the working chamber, and at the same time the germs and the smaller maize particles are conveyed away through the perforations in the working housing 2. For this purpose the working housing 2 is perforated over the entire surface. In this way, depending on the particular use, it is readily possible to carry out 60%–80% or even 90% and more of the degerming work in a single pass, so that only a small proportion of the mass of product leaves the working housing through the outlet aperture 7. Thus in this connection it is an advantage to arrange the aperture 7 right at the top, so that there is also a certain holding-back effect.

By means of the high rotational speed of the rotor, the material is nevertheless thrown out through the aperture and the working housing is cleaned by the rotor automatically.

The two halves of the working housing 2 and also the rotor 1 can be inspected, assembled or dismantled through the maintenance doors 30 and/or 31. The working housing 2 is secured by vibration-damping elements 36 on the collecting box 3. The inlet union 6, as FIG. 2 shows, opens tangentially into the working chamber. The collecting casing 3 converges underneath to form two channels 32, 33 with product outlets 34, 35. The construction of the apparatus shown in FIGS. 1, 2, 3 and 5 is used preferably for dry degerming.

Figure 4:
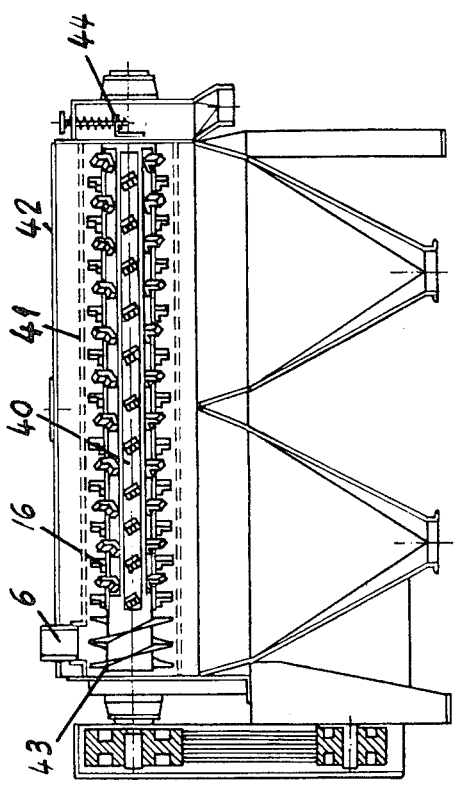
FIG. 4 shows a second form of the apparatus in section.

The construction shown in FIG. 4 has been found more suitable for degerming a product in the moist state. The basic construction in FIG. 4 is essentially the same as in FIG. 1 so that it is not necessary to repeat the description of the corresponding parts. A rotor 40 is arranged in a working housing 41 surrounded by a collecting casing 42. The most noticeable feature in FIG. 4 is the take-in or feed worm 43 which can be constructed with one or more threads and is arranged directly on the rotor 40 in place of blades 16. The feed worm 43 has a root diameter equal to the diameter of the rotor to which the blades 14 are fixed.

If the maize is in a moist state, it has of course a very unpleasant sticky property. Especially the fine particles, abraded material etc. are known to stick to wall portions and very quickly form thick layers until free passage is prevented. It is known in the processing of maize that particularly the product inlet tends to become blocked. Thus the persons skilled in the art carrying out the experiments were also very surprised when there was no such blockage. This is put down on the one hand to the high rotational speed of 800–1100 revolutions per minute, with a relatively large diameter, and on the other hand to the actual construction using a feed screw, as distinct from a pressure worm. The rotor 40 constructed as a hollow shaft here also has a uniform diameter over its entire length, and the external diameter of the feed screw is approximately the same in value as that of the blades 16, so that the depth of the feed worm 43 corresponds approximately to the height "X" of the working chamber, that is to say about one hand's width, say about 10 cm, perhaps ±2 cm, or about 5–10 times the length of a grain of maize.

In the case of a worm with two threads, it is sufficient to have one complete thread revolution in each case. But the feed screw 43 is to project at both sides beyond the inlet aperture 5.

As further explained below with a diagram, the new solution makes it possible with a suitable preparation of maize, particularly with heat and moisture, to carry out an almost complete husking also at the same time as the degerming. In order to achieve this, it has been found advantageous to produce a damming-up effect from the outlet end backwards. The husks which are easily released after the previous treatment are then released partly also as a result of the friction between grain and grain and on the apparatus (blades 16 and the working housing 2) and can then be separated out. The amount of the damming-up effect can be selected with the particular setting of a valve 44.

FIG. 6 shows a diagrammatic longitudinal section through a grain of maize. The view is enlarged about ten times from its natural dimensions. Only the particularly interesting portions are shown in this case. The entire grain of maize is enclosed with a husk or shell 50. In the inward direction there are three layers: the aleurone 51, the horny endosperm 52 and the floury endosperm 53 which together form the endosperm body. The innermost portion, which amounts in area to about ⅓, is the actual germ 54. The tip cap 55 is right at the bottom.

Owing to its particular property and more especially because of the high content of fat, the germ has an elastic behaviour. In contrast, the endosperm is rather brittle. These are the two most important properties, in addition to weight, and allow maize to be separated into endosperm and germ in large-scale industrial operations.

Figure 7:
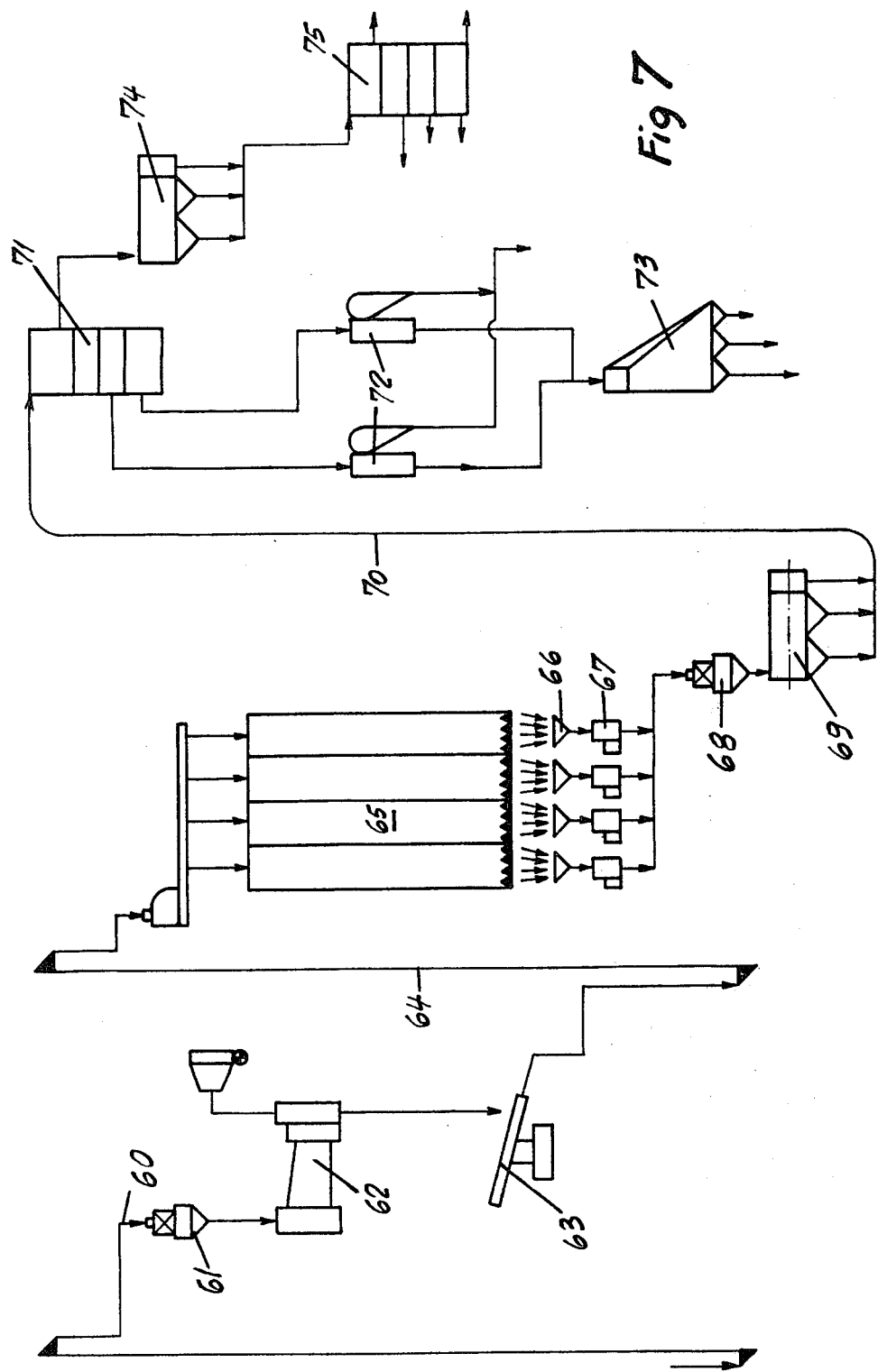
FIG. 7 is a simplified mill diagram of the procedure involved in carrying out cleaning, degerming and germ separation (the so-called dry degerming method)

FIG. 7 shows with a simplified diagram the processing of maize in a dry state. The raw grains of maize are introduced at 60, conducted by way of a weigher 61 and a screen with a subsequent suction duct 62. Foreign bodies such as stones, are picked out on a sorting table 63 and the cleaned maize is stored by way of a conveyor 64 in a silo plant 65.

In order to obtain a constant quality from the end products, the maize in its mixed state is removed by way of special outlets 66, and conducted by way of dosaging apparatus 67 to a weigher 68 in which the particles of maize are fed into the apparatus for degerming 69 approximately as shown in FIG. 1.

All the degermed maize fractions (the portion which falls through the screen perforations of the working housing 2 and also the portion which falls through the product outlet aperture 7 in FIG. 1) are conducted with a conveyor into a plansifter 71. The plansifter 71 calibrates the product into various size classifications. The medium and relatively small fractions are fed into a winnowing machine 72 which takes away light portions such as husks, etc. The actual separation into germs and endosperm fractions is carried out in a sorting table 73 which separation can be effected by using the differences in weight between germ and endosperm particles. The insufficiently comminuted fractions are supplied directly from the plansifter 71 to a second apparatus for degerming 74 and a subsequent separation stage in the form of a second plansifter 75, etc. Of course, in actual practice it is possible depending on requirements to provide further process stages, for example rolling degerming etc.; but this is not the subject of the present patent specification.

Figure 8:
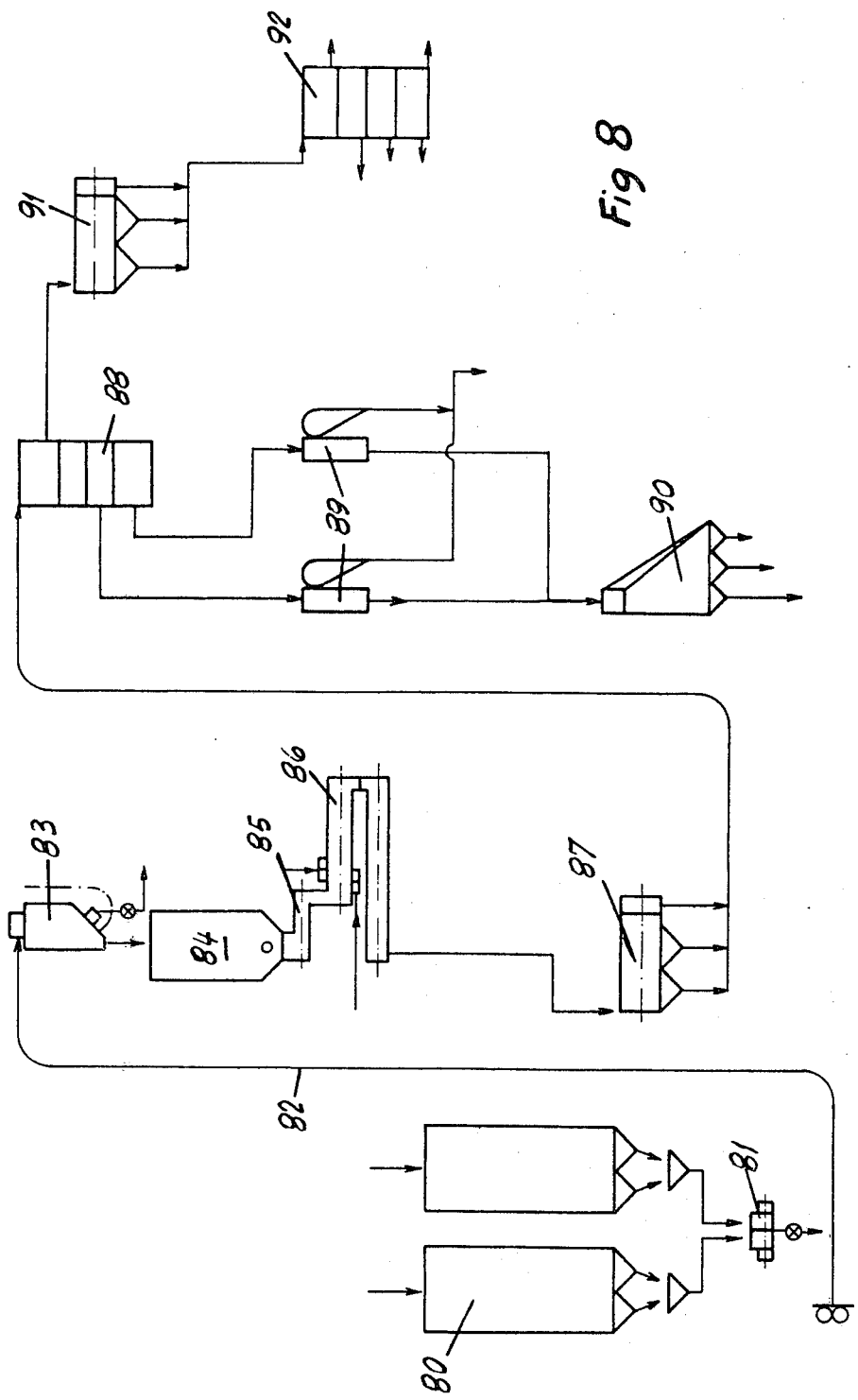
FIG. 8 illustrates in simplified manner the processing of maize in the moist state.

FIG. 8 shows so-called moist degerming. Cleaning and silo plants are not shown in this case. The whole maize grains are delivered from containers 80 and a dosaging apparatus 81 by way of a conveyor 82 and a separator 83 into a preliminary container 84. Then the maize is supplied by way of a dosaging worm 85 to a heat and stream treatment stage 86, for the purpose of detaching the husk from the endosperm. Then the product is transferred directly into an apparatus 87 for carrying out degerming and husking approximately as shown in FIG. 4. Separation into the individual fractions is carried out similarly to the arrangement shown in FIG. 7 by way of a plansifter 88, winnowing machine 89 and table sorter 90, but in this case a correspondingly larger proportion of husks is obtained. The insufficiently comminuted particles of maize are again fed to the degerming apparatus 91, which can be an apparatus as shown in FIG. 1 or FIG. 4. The actual separation here again is indicated diagrammatically by means of a plansifter 92.

To the surprise of persons skilled in the art who took part in development trials the method described above was found to constitute a substantial improvement on known methods, at least for a large number of applications. With the same quality as with the hitherto known methods, the necessary motor power could be reduced by sometimes 30–40%. Because a loose bed of product similar to a fluidized bed is maintained on the one hand but it is only admitted and moved in an annular shape, whereas on the other hand the work is carried out by edges or blades projecting from the rotor, it is possible to reduce the friction and to deliberately improve the effectiveness of the degerming operation, and to carry out substantial degerming with a minimum amount of fine fragments.

Also the apparatus described above are able to obviate the disadvantages of the hitherto known apparatus. This is not self-evident particularly if it is considered that on the one hand it is desired to obtain a specific working effect, namely separating the germ from the remainder of the maize grain, whereas on the other hand this work has to be carried out in the dark, so to speak. In the new apparatus the edges of the blades treat each individual grain within a quantity of grains moving past as a loose stream of product. The annular construction of the working chamber ensures an orderly throughflow of each individual maize grain. The new apparatus requires relatively little power and produces little noise.

What I claim is:

1. Apparatus for degerming maize comprising:
   (a) a substantially circular working housing having an inlet aperture at one end and an outlet aperture at the other end;
   (b) a rotor mounted for relatively rapid rotation in the housing about an axis, the rotor and a wall of the housing forming an annular working chamber therebetween, wherein maize enters the working chamber through the inlet aperture;
   (c) a relatively large number of blades carried by the rotor, each blade having two oppositely facing, spaced sides which extend along the blades generally radially from the rotor and terminate proximate the wall of the housing, and a generally planar surface which intersects the spaced sides along their radial lengths to define two discrete degerming edges, one at each intersection of said generally planar surface with said spaced sides, said edges being spaced far enough apart such that each edge is able to independently act on the maize and separate the germ from the endosperm of the maize; and
   (d) wherein the housing is perforated with perforations of sufficient size such that the separated germ passes out of the working chamber through the perforated housing while the degermed maize and any undegermed maize is retained in the housing to pass out of the working chamber through the outlet aperture.

2. Apparatus according to claim 1 wherein the working housing is cylindrical and the working chamber is a cylindrical annulus.

3. Apparatus according to claim 1 or claim 2 wherein the rotor is a hollow shaft.

4. Apparatus according to claim 1 or claim 2 wherein the said edges of the blades extend radially with respect to the rotor.

5. Apparatus according to claim 1 or claim 2 wherein at least part of the larger face of each blade is inclined at an angle of 60° to 90° to the rotor axis.

6. Apparatus according to claim 1 or claim 2 wherein the blades are mounted on the rotor in such a way that the angle of the blades with respect to the rotor axis is adjustable.

7. Apparatus according to claim 1 or claim 2 wherein the rotor carries not less than 60 blades.

8. Apparatus according to claim 1 or claim 2 wherein the rotor carries not less than between about 120 and 320 blades.

9. Apparatus according to claim 1 or claim 2 wherein the rotor includes a feed screw in the region of the housing inlet aperture.

10. Apparatus according to claim 9 wherein the inlet aperture is directly above the axis of the feed screw.

11. Apparatus according to claim 1 or claim 2 wherein the working housing and the rotor are within a collecting casing and the housing is supported from the casing by way of vibration damping elements.

12. Apparatus according to claim 1 or claim 2 wherein the rotor axis extends horizontally.

13. Apparatus according to claim 1 or claim 2 wherein the outlet aperture is from an upper region of the housing and opens into a collecting receptacle.

14. Apparatus according to claim 1 or claim 2 wherein the outlet aperture is adjustable by a valve.

15. Apparatus according to claim 1 wherein the working housing is perforated over a major part of its working surface.

16. Apparatus according to claim 1 wherein the working housing is perforated over substantially an entire working surface or the working housing facing the blades.

17. Apparatus according to claim 1 or claim 2 wherein the radial dimension of the annular working chamber between the rotor and the working housing is about 10 cm, plus or minus about 2 cm, or about 5 to 10 times the length of a grain of maize.

18. Apparatus according to claim 1, wherein the rotor rotation is sufficiently rapid and the number of blades sufficiently large that not less than about 60% of the maize is degermed during passage through the working chamber from the inlet aperture to the outlet aperture where the degermed and the remaining undergermed maize exit from the working chamber.

19. Apparatus according to claim 1, wherein each blade is about 1 centimeter thick.

20. Apparatus according to claim 19 wherein sides of a blade are spaced from each other at least one centimeter.

21. Apparatus for degerming maize comprising:
(a) a substantially circular working housing having an inlet aperture at one end and an outlet aperture at the other end;
(b) a rotor mounted for relatively rapid rotation in the housing about an axis, the rotor and a wall of the housing forming an annular working chamber therebetween wherein maize enters the working chamber through the inlet aperture;
(c) a relatively large number of blades carried by the rotor, each blade having two oppositely facing, spaced sides, which extend along the blades generally radially from the rotor and terminate proximate the wall of the housing, and a generally planar surface which intersects the spaced sides along their radial lengths to define two discrete degerming edges, one at each intersection of said generally planar surface with said spaced sides, said edges being spaced far enough apart such that each edge is able to independently act on the maize and separate the germ from the endosperm of the maize, and wherein at least a portion of each of said degerming edges extends obliquely with respect to a tangent to said wall of the housing at a location radially outward from said each degerming edge; and
(d) wherein the housing is perforated with perforations of sufficient size such that the separated germ passes out of the working chamber through the perforated housing while the degermed maize and any undegermed maize is retained in the housing to pass out of the working chamber through the outlet aperture.

* * * * *